(12) United States Patent
Nader et al.

(10) Patent No.: US 12,604,267 B2
(45) Date of Patent: Apr. 14, 2026

(54) METHODS FOR AVOIDING ADVERSE EFFECTS CAUSED BY NES

(71) Applicant: Telefonaktiebolaget LM Ericsson (publ), Stockholm (SE)

(72) Inventors: Ali Nader, Malmo (SE); Andres Reial, Hollviken (SE); Sina Maleki, Stockholm (SE); Helka-Liina Maattanen, Espoo (FI); Sladana Josilo, Solna (SE); Lian Araujo, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 325 days.

(21) Appl. No.: 18/229,000

(22) Filed: Aug. 1, 2023

(65) Prior Publication Data

US 2025/0048261 A1     Feb. 6, 2025

(51) Int. Cl.
*H04W 52/02* (2009.01)

(52) U.S. Cl.
CPC .............................. *H04W 52/0216* (2013.01)

(58) Field of Classification Search
None
See application file for complete search history.

(56) References Cited

U.S. PATENT DOCUMENTS

2013/0095842 A1* 4/2013 Jia ..................... H04W 52/0206
                                                            455/452.1
2023/0094063 A1* 3/2023 Si ....................... H04W 52/0235
                                                            455/517

2024/0381248 A1* 11/2024 Esswie .................. H04W 76/28
2025/0159603 A1* 5/2025 Choe ..................... H04W 88/02
2025/0203706 A1* 6/2025 Wu ........................ H04W 48/12

FOREIGN PATENT DOCUMENTS

WO         2024028814 A1     2/2024

OTHER PUBLICATIONS

"3rd Generation Partnership Project; Technical Specification Group Radio Access Network; Study on network energy savings for NR (Release 18)", Technical Report, 3GPP TR 38.864 V18.0.0, (Dec. 2022), 71 Pages.
"5G; NR; Radio Resource Control (RRC); Protocol specification (3GPP TS 38.331 version 17.3.0 Release 17)", Technical Specification, ETSI TS 138 331 V17.3.0 (Jan. 2023), 1295 Pages.
Huawei, "New WID: Network energy savings for NR", 3GPP TSG RAN Meeting #98-e, RP-223540, (Revision of RP-223432), Dec. 12-16, 2022, 6 Pages, Electronic Meeting.
"3rd Generation Partnership Project; Technical Specification Group Radio Access Network; NR; Radio Resource Control (RRC) protocol specification (Release 17)", Technical Specification, 3GPP TS 38.331 V17.4.0 (Mar. 2023), 1324 Pages.

* cited by examiner

*Primary Examiner* — Walter J Divito
(74) *Attorney, Agent, or Firm* — FBT Gibbons LLP

(57) ABSTRACT

Methods and systems are provided for NES (network energy savings) operations in a network. A network node may transmit to user equipments (UEs) an indication about an NES operation activation for one or more cells. The UE(s) may send a reconfiguration request to modify the NES operation for one or more cells, for example to avoid a degradation in service that may negatively impact key performance indicators or quality of experience. In response, the network node may modify the NES operation. The network node may then send an updated indication about the modified NES operation for the one or more cells.

20 Claims, 8 Drawing Sheets

300

310 — RECEIVING FROM A NETWORK NODE AN INDICATION
ABOUT AN NES OPERATION ACTIVATION
FOR ONE OR MORE CELLS

320 — SIGNALING TO THE NETWORK NODE UE FEEDBACK
RELATED TO THE NES OPERATION FOR
THE ONE OR MORE CELLS

330 — RECEIVING FROM THE NETWORK NODE AN UPDATED
INDICATION ABOUT THE MODIFIED NES OPERATION
FOR THE ONE OR MORE CELLS

500

510 — SIGNALING TO ONE OR MORE UES AN INDICATION ABOUT ACTIVATION OF A NES OPERATION AT ONE OR MORE CELLS

520 — RECEIVING FROM AT LEAST ONE OF THE ONE OR MORE UES A RECONFIGURATION REQUEST RELATED TO ONE OR MORE SERVING CELLS OF THE ONE OR MORE UES

530 — MODIFYING THE NES OPERATION BASED AT LEAST IN PART ON THE UE FEEDBACK

2100

COMMUNICATION SYSTEM

HOST
2116

TELECOMMUNICATION NETWORK
2102

CORE NETWORK
2106

CORE NETWORK
NODE
2108

ACCESS NETWORK
2104

NETWORK NODE
2110A

NETWORK NODE
2110B

UE
2112A

UE
2112B

HUB
2114

UE
2112C

UE
2112D

METHODS FOR AVOIDING ADVERSE EFFECTS CAUSED BY NES

TECHNICAL FIELD

The present disclosure generally relates to the technical field of wireless communications and more particularly to network energy savings techniques.

BACKGROUND

Energy consumption is a considerable challenge of 5G systems today where a major contributor to the energy consumption is the radio unit of RAN (Radio Access Network) systems. The NW (network) power consumption for NR (New Radio) is said to be less compared to LTE (Long Term Evolution) because of its lean design, i.e., no CRS (Cell Specific Reference Signal) and the SSB (Synchronization Signal Block) periodicity is by default 20 ms. However, NR in the current implementation might consume more energy compared to LTE, partly due to higher BWs (bandwidths), shorter TTIs (Transmission Time Interval) and massive number of antennas. This is still evident even at times when cells and beams are lightly loaded or serve no traffic or no users at all. To enable an energy efficient NW, 3GPP initiated a study item (SI) on (NES) network energy savings in NR, which was concluded with the outcome captured in TR 38.864, Study on network energy savings for NR (Release 18) version i00.

Following the SI phase, a new work item (WI) on NES for NR was approved at RAN #98. The WI aims to specify the following enhancements:

1) Specify SSB-less SCell (secondary cell) operation for inter-band CA (Carrier Aggregation) for FR1 (frequency range 1) and co-located cells, if found feasible by RAN4 study, where a UE measures SSB transmitted on PCell (primary cell) or another SCell for an SCell's time/frequency synchronization (including downlink AGC (automatic gain control)), and L1/L3 (layer 1/layer 3) measurements, including potential enhancement on SCell activation procedures if necessary [RAN4, RAN2].

2) Specify enhancement on cell DTX/DRX (discontinuous transmission and reception) mechanism including the alignment of cell DTX/DRX and UE (user equipment) DRX in RRC_CONNECTED (Radio Resource Control Connected) mode, and inter-node information exchange on cell DTX/DRX [RAN2, RAN1, RAN3];

a) Note: No change for SSB transmission due to cell DTX/DRX;

b) Note: The impact to IDLE/INACTIVE UEs due to the above enhancement should be avoided.

3) Specify the following techniques in spatial and power domains:

a) Specify necessary enhancements on CSI (Channel State Information) and beam management related procedures including measurement and report, and signaling to enable efficient adaptation of spatial elements (e.g. antenna ports, active transceiver chains) [RAN1, RAN2];

b) Specify necessary enhancements on CSI related procedures including measurement and report, and signaling to enable efficient adaptation of power offset values between PDSCH and CSI-RS [RAN1, RAN2];

c) Note: Above objectives are only for UE specific channels/signals;

d) Note: Legacy UE CSI/CSI-RS (CSI Reference Signal) capabilities applies when considering total number of CSI reports and requirements.

4) Specify mechanism(s) to prevent legacy UEs camping on cells adopting the Rel-18 NES techniques, if necessary [RAN2].

5) Specify CHO procedure enhancement(s) in case source/target cell is in NES mode [RAN2].

6) Specify inter-node beam activation and enhancements on restricting paging in a limited area [RAN3].

7) Specify the corresponding RRM/RF (Radio Resource Management/Radio Frequency) core requirements, if necessary, for the above features [RAN4].

Conditional Handover (CHO)

When the radio link becomes degraded and the UE needs to send measurement reports, it is possible that those reports never reach the network since the uplink is degraded or even if they do, the network tries to respond with a handover command that may never reach the UE if the downlink is degraded. FIG. 1 shows when these two cases might happen. Either a measurement report may never reach the source node, or a handover command may not reach the UE.

To remedy these failure cases, Conditional Handover (CHO) was introduced in 3GPP. The main motivation of this handover mechanism is to reduce the number of failure occurrences while a UE is moving, e.g., when a handover between cells fails, or when a connection fails even before a handover (HO) is triggered. In CHO, instead of preparing one target cell as in a regular (non-CHO) handover, one or more candidate target cells are prepared in advance in the network. This enables the network to send the handover command to the UE at an earlier stage compared to a regular handover, i.e., the handover command is sent when the radio conditions are still good, rather than when the radio conditions start to get degraded as in a regular handover. When received, the UE stores the handover command (and the RRC configurations included in the message), instead of applying it immediately, and starts to evaluate the CHO trigger condition(s) configured by the network. The UE only applies the stored handover command (and the associated RRC configuration) when the CHO trigger condition(s) configured by the network is satisfied for one of the configured candidate target cells. Then the UE executes the handover and connects to the target node as in a regular handover.

In conditional handover, instead of transmitting the measurement report, the UE applies the stored handover command message (and the associated RRC configuration) when the CHO trigger condition is satisfied for one of the configured candidate target cells. The network may also configure two CHO trigger conditions for the UE and associate both to the stored handover command, i.e., the handover command is applied only if both CHO trigger conditions are fulfilled, e.g., conditions configured for different types of measurement quantities, like cell coverage represented by Reference Signal Received Power (RSRP), and quality represented by Reference Signal Received Quality (RSRQ).

It is also possible that a failure is detected while the UE is monitoring the configured conditions. In legacy, the UE would perform cell selection and continue with a re-establishment procedure. However, with conditional handover, when the same type of failure is detected, e.g., a radio link failure or handover failure, the UE can prioritize a cell for which it has a stored handover command and, instead of performing re-establishment, it performs a conditional handover, which reduces the interruption time and the signalling over the air interface.

As mentioned above regarding CHO procedure enhancements, enhancements in CHO are proposed to target the NES scenarios. For example, a UE may be prepared with conditions related to a source/target gNB NES state where the term NES can be anything from a gNB completely turned off to a gNB operating in a relaxed manner with respect to one or more of time—(e.g., Cell DRX/DTX) and/or frequency—(operating with limited bandwidth), and/or power—(operating with reduced output power), and/or spatial (operating with fewer antennas) resources.

User Assistance Information (UAI)

UE assistance information is a message which is defined in LTE and NR specifications. This is an RRC message which the UE can trigger to assist the NW in its operation towards the UE. This message contains several different types of information, for example information about that the UE is preferring a certain DRX setting, that the UE is overheated, etc. The NW can individually configure the UE to send the different information elements (IEs) of this message. For example, the NW can configure the UE to send the overheating information, but not send information related to the UE preferred DRX setting, and vice versa. For some types of information, the NW can configure the UE to send separate assistance information relevant for the Master Cell Group (MCG) and Secondary Cell Group (SCG). The limit on how frequent the UE could send UAI is usually determined by the prohibit timer set by the NW for each UAI item. The NW, then, could configure the UE by the respected configurations whenever possible. It should be noted, however, that the NW also has its own consideration before blindly following the configurations suggested by the UE. The complete UAI available of a UE can be seen in the UEAssistancelnformation information element captured in TS 38.331 Section 6.2.2.

SUMMARY

One embodiment under the present disclosure comprises a method performed by UE for preference signaling regarding NES operation. The method comprises receiving from a network node an indication about an NES operation activation for one or more cells; signaling to the network node UE feedback (e.g., reconfiguration request) related to the NES operation for the one or more cells; and receiving from the network node an updated indication about a modified NES operation for the one or more cells.

Another embodiment of a method under the present disclosure is a method performed by a network node for activation of a NES operation. The method comprises signaling to one or more UEs an indication about activation of a NES operation at one or more cells; receiving, from at least one of the one or more UEs, UE feedback (e.g., reconfiguration requests) related to one or more serving cells of the one or more UEs; and optionally modifying the NES operation based at least in part on the UE feedback.

Another embodiment comprises a network node for activation of a NES operation. The network node comprises processing circuitry configured to perform the steps of, signaling, to one or more UEs an indication about activation of a NES operation at one or more cells; receiving, from at least one of the one or more UEs, UE feedback related to the one or more cells; and modifying the NES operation based at least in part on the UE feedback. The network node further comprises power supply circuitry configured to supply power to the processing circuitry.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Figure 1:
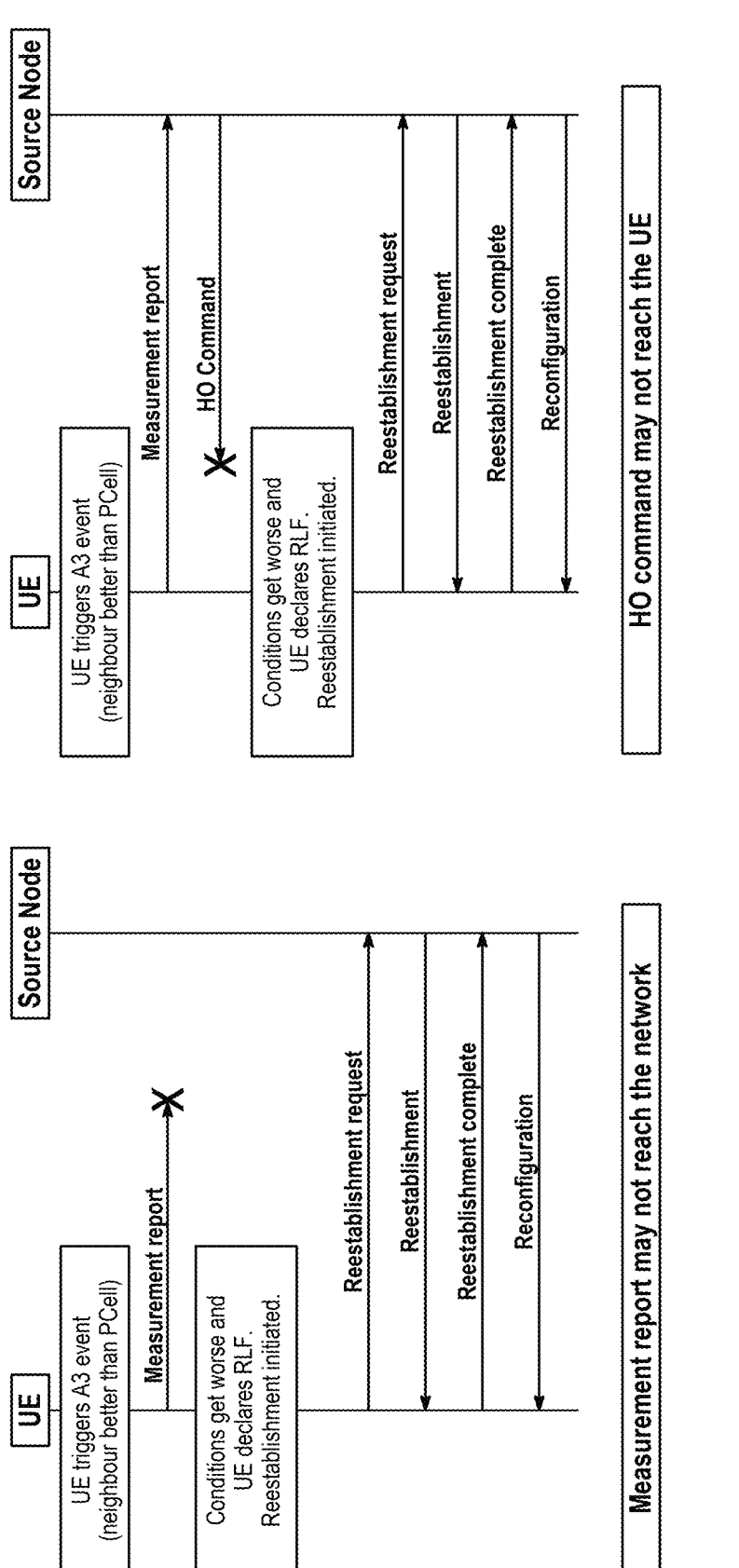
FIG. 1 illustrates examples of failed handover between a UE and a node.

Before describing various embodiments of the present disclosure in detail, it is to be understood that this disclosure is not limited to the parameters of the particularly exemplified systems, methods, apparatus, products, processes, and/ or kits, which may, of course, vary. Thus, while certain embodiments of the present disclosure will be described in detail, with reference to specific configurations, parameters, components, elements, etc., the descriptions are illustrative and are not to be construed as limiting the scope of the claimed embodiments. In addition, the terminology used herein is for the purpose of describing the embodiments and is not necessarily intended to limit the scope of the claimed embodiments.

There currently exist certain challenges in the technology described above. Techniques that are introduced to relax the gNB energy consumption may have a negative impact on UE Quality of Experience (QoE). Also, the gNB may not always be aware of the potential delay incurred if the UE is not able to contact the gNB at certain points in time or if the UE is not served as during normal gNB operations. In some cases, depending on the type of UE and/or type of application running in the UE, it may be highly undesired to operate the gNB in one or more of the said energy saving modes. The gNB may for instance not be aware of the importance of certain over the top (OTT) applications. Alternately, the gNB may not always be aware of potential emergency bearers that are negotiated between the core NW (CN) and the UE. For the NW to choose the most appropriate energy-saving technique in a particular scenario, it is important to support a framework that would allow the UEs to provide the information to the NW that can further enhance NW energy-saving techniques. Based on its own knowledge and on the feedback from the UEs, the NW can then make decisions that would be beneficial in terms of energy-saving at the NW side (and possibly at the UE side) with no or limited impact on the overall system performance.

When it comes to CHO, UEs may for example be notified that the current/serving cell is about to go into a NES operation state (e.g., about to completely turn off) based on which the UEs may be configured to handover to other target cells based on earlier provided RRC configurations. However, for a certain UE, there may not exist any (or any suitable) candidate target cells to handover to. Since the source (serving) gNB may lack information about the specific UE's lack of suitable candidate target cells, the UE may end up in a very undesired situation, potentially out of coverage.

In U.S. 63/394,799, methods were introduced to provide assistance from the UE to the NW about how a NW sleeping pattern affected the UE's QoE. However, the assistance in U.S. 63/394,799 was of the type that informed the NW how much the QoE was affected after the NW had chosen a certain NES operation mode. For example, the UE of U.S. 63/394,799 would upon reconnection to the NW inform that a radio link failure was caused by the NW's decision for having chosen a NES mode. Or the UE would report in hindsight that the NES choice of NW had caused delays for packages in UL.

In general, activation of NES features in serving or neighbor cell(s) of UEs in the NW may in some scenarios compromise performance KPIs (key performance indicators) or RRM procedures for some UEs, without the NW always being aware of the impact. There is thus a need for a method to avoid or mitigate such adverse impacts.

Certain aspects of the disclosure and their embodiments may provide solutions to these or other challenges. Some of the embodiments contemplated herein will now be described more fully with reference to the accompanying drawings. Embodiments are provided by way of example to convey the scope of the subject matter to those skilled in the art.

In certain embodiments, when the gNB aims to go into a NES mode and if the NES mode is such that it might affect certain services/UEs negatively, the gNB may inform the UEs that it is about to go into said NES mode and provide a pre-warning window during which the UEs can request the gNB to not go into said NES mode. The UE would have the option to indicate that it wants to be exempt from the NES mode completely, e.g., the gNB could then remain active (or in a non-NES mode) for this UE's sake even when it is officially (for other UEs) in a NES mode (e.g., cell DTRX). Alternately, the UE could propose another NES scheme or another specific configuration for the same NES scheme (e.g., shorter DTRX off duration). The UE preference or request may also be sent when the NES mode has already been activated by the gNB and/or configured for the UE.

In embodiments related to the case of CHO, the UE can indicate to the gNB that it cannot find any of the target cells and the serving gNB should not go into NES mode (e.g., turn off completely). Alternately the UE would be able to indicate that it does not prefer any of the candidate target cells as they might be operating in a non-desirable NES mode. Based on such indication, the serving cell may choose to change its own scheme or inform the neighbor/target gNB via NW internal interfaces to change its NES scheme (e.g., stop the neighbor from operating in NES mode, or change configuration of the neighbor NES mode).

Figure 2:
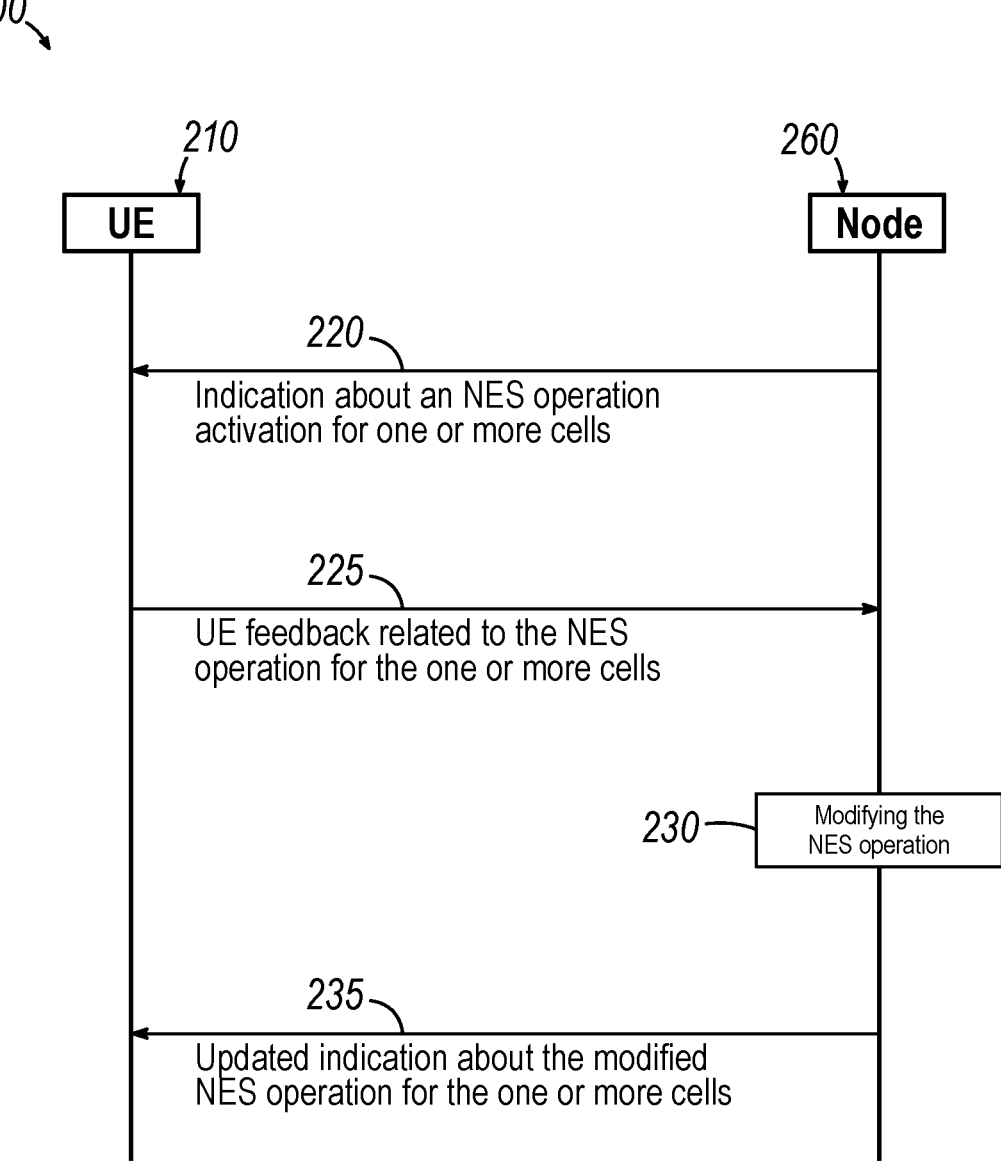
FIG. 2 illustrates a flow chart of a method embodiment under the present disclosure.

FIG. 2 illustrate a possible method embodiment 200 from the perspective of a UE 210 and a network node 260. At 220, the network node sends a UE(s) an indication about an NES operation activation for one or more cells. At 225, the UE(s) send a reconfiguration request or other type of UE feedback related to the NES operation for one or more cells. At 230, the network node modifies the NES operation. At 235, the network node sends an updated indication about the modified NES operation for the one or more cells. Network node 260 can comprise a gNB, eNB, base station or any of a variety of nodes in a telecommunication system.

Certain embodiments may provide one or more of the following technical advantages. Embodiments can enable UEs to prevent a network node/gNB/base station from going into a NES mode (or a configuration of a NES feature) that would have detrimental effects on QoE or another KPI for a certain UE or service type. Certain embodiments disclosed herein can enable a UE to prevent the gNB from going into a NES mode (or a configuration of a NES mode) that would have detrimental effects on QoE for a certain UE/service type. In one example, the NES mode is UE specific, and thus gNB going to a NES mode is also UE specific, e.g., antenna or power adaptation of UE specific channels/signals, while in other examples, the NES mode may be be group common or cell specific, e.g., adaptation of antennas and power for a group or all UEs, or a cell specific DTX/DRX. Example of NES modes inflicting negative QoE are completely turning off a cell or parts (beams) of a cell, cell DTX/DRX with longer off durations than what would be acceptable/suitable for a service. Another example of NES mode could be related to operation of secondary cells (SCells) or neighbor cells where said cells are about to be put to sleep by the NW in order to save energy. Other examples can be that the SCells are not configured with SSBs, and the UE does not find the synchronization to be achieved through other bands (inter or intra bands) satisfactory.

The NES mode may be of such characteristic that it is applicable to all UEs of the cell, or only a group of UEs, or only one single UE. For example, if a cell is completely turned off it impacts all UEs of the cell, whereas if the transmit power or number of antenna ports is reduced it may only impact a single UE in case only the transmit power or antenna adaptation is for the PDSCH (Physical Downlink Shared Channel) transmission towards that specific UE. In some examples, the NES mode is UE specific, however, it may impact other UEs as well, e.g., the gNB adapts the number of antennas or transmit power for a UE, nevertheless, others UEs which are scheduled at the same time, e.g., in same slot are also impacted.

In one aspect, the gNB informs the UEs about its intended NES operation activation. For example, the gNB may inform the UEs that it is about to turn off one or more of its cells or one or more of its beams/antenna panels/ports. Based on this information the UE may decide that its QoE will suffer in an unexpected way. The UE may for example have been configured with an emergency service bearer by the CN which the gNB may be unaware of in which case a NES operation mode of gNB is not suitable.

In one embodiment, the gNB additionally informs the UEs about characteristics/configuration of the intended NES operation. For example, the gNB may provide information to the UEs that for an intended NES cell DRX or DTX mode, a certain duty cycle is going to be configured. Based on said information, the UE would know how often the UE would be able to reach the NW and decide whether the operation has detrimental effects on one or more services that the UE is/may become involved in. For example, the UE may be involved in an over-the-top application in which voice/video-frame packages do not tolerate delays above 40 ms while the off durations are in the intended configuration are longer than that. In another example, the UE receives an indication from the gNB that the number of antennas or power is adapted for one or more of UE or group common or cell specific channels/signals, and the adaptation may impact the UE QoE, e.g., the video quality would be reduced. In another example, the adaptation may impact the UE's synchronization quality, e.g., if SSB on a SCell turned off and the UE cannot acquire a proper synch from other cells. In another example, the gNB configures the UE with a CHO, but none of the target cells are satisfactory for the UE. For example, the target cells may be perceived as weak in terms of radio conditions, or the target cells may be operating with a non-preferable NES configuration. In another example, the UE receives a configuration regarding a dynamic adaptation of UL channels/signals, e.g., PRACH (Physical Random Access Channel), however, the UE may need more frequent PRACH occasions, e.g., if the UE does not receive SR, or even in idle/inactive mode, the UE may need more PRACH occasions, due to time sensitive UL signals/channels. In another example, the UE receives a configuration that the UE should receive SSB/SIB1 (System Information Block Type 1) or other SIs (System Information) from an anchor cell, however, the reception quality from anchor cell is not good enough. Other examples of NES modes/functions/adaptations/techniques are not excluded.

In one embodiment, the gNB may inform the UE about the activation time (and possibly the time window) of said NES mode and potential configuration thereof. For example, the gNB may have informed that the said NES mode/configuration is going to be activated X ms (milliseconds) or number of slots from the time of information reception. Alternately, the UE may be provided with an absolute time such as a specific system frame time (SFN (System Frame Number)) or alike at which the gNB is going to activate said NES mode/configuration. Additionally, the gNB may have informed that the said NES mode/configuration is intended to be applicable for a duration of Y seconds, and/or milliseconds from the moment it is activated.

In one embodiment, the network has configured, in common or dedicated signaling, a cell common cell DTX and/or DRX pattern. The configuration, or other configuration may provide specific UL resources for the UE to indicate to the network that it has for example incoming call, or other data to send. Network may then serve the specific UE regardless of the configured cell DTX/DRX pattern that other UEs in the cell follow. Network may also deduce this from an earlier buffer status report (BSR) sent by the UE. It may also be specified for the UEs to send additional BSR or other indication of need to be served before the planned cell off period, whether DTX or DRX or both. Network may configure additional resources to receive such indication before each planned off period.

In one aspect, the gNB not only provides information about its own operation, but also about neighbor cells' NES operational state/configuration. The serving gNB may acquire such information from the neighbor gNB cells via the internal interfaces such as the Xn interface (interface between two gNBs in NR) or indirectly via CN interfaces where CN nodes such as AMF (Access and Mobility Management Function) act as a relay. For example, if the UE is additionally configured with CHO and a list of target cells, the UE may additionally be notified of the specific NES modes which is applied in the target cell.

The gNB may have configured a UE to be allowed to provide feedback on the intended operation and configuration thereof for one or more of the serving cells and/or neighboring cells. Such feedback may be binary (e.g., OK, not OK), or more elaborate. For example, the feedback may include another NES configuration preference (e.g., another DTX/DRX cycle off duration). Alternately, the UE may ask to be exempt from NW NES operation. As such, even though the gNB is operating in NES mode towards other UEs, based on this specific UE's feedback it may refrain from activating NES mode towards this UE.

In one aspect, the gNB may give the UE choices including a set of NES mode/configuration parameters that the UE can select among and provide feedback on its selection to the gNB. In one aspect, the UE feedback may be temporary, i.e., include a time period during which the UE does not prefer NES mode.

In one aspect, the gNB may configure the UE, or certain services running in the UE, to be allowed/disallowed to provide reconfiguration assistance to the serving or neighboring gNB's intention, or exemptions therefrom. For example, if the NES mode is related to UE specific channels/signals, the gNB may consider its own understanding of UE QoE sufficient to make the decision, and thus do not need the UE feedback for that.

The gNB configuration/information above may be provided by the NW via any of broadcast (e.g., system information), multi/group-cast (e.g., MBS (Multicast Broadcast Services)), or unicast channels (e.g., via dedicated RRC signaling).

In one aspect the UE may have been configured with CHO including NES conditions. For example, the UE may have been configured to handover to other cells in case the serving cell intends to enter a NES mode (e.g., turning off). The UE may however end up in a scenario in which it does not find any suitable neighbor target cell and it may even suffer from outage in case the serving cell goes into said NES mode. In one embodiment, the UE informs the serving gNB that the CHO will fail as there are no suitable neighbors and the serving gNB may adapt its operation e.g., to not go into NES mode. In another example, the UE may find some target cells but these may be operating in non-preferable NES mode/configuration. Hence, in another embodiment, the UE provides feedback to the gNB that the neighbor cells are operating in a non-preferable NES mode, or with a non-preferable NES configuration. The serving gNB may then either provide the UE with new candidate targets or ask the neighbor gNBs to change their NES-associated configuration. The gNBs in this communicate via the NW internal interfaces such as Xn.

In one aspect, the gNB configures the ULE such that the UE is allowed to provide said reconfiguration assistance/complaint/exemption request until a certain time before the first activation time, otherwise the reconfiguration assistance/complaint/exemption request is not considered by the gNB. In one realization, the UE is allowed to provide the request in periodic or aperiodic times or time windows, e.g., the UE may be happy with QoE in the beginning of a NES mode, but starts to see degradation as it goes, and thus can send the request in those slots. In one example, the UE may be configured to be allowed to transmit the request in one or more PRACH occasions.

In all embodiments above, the feedback from the UE can be in an RRC message such as UE Assistance Information, a newly introduced message, or as information elements added to another existing RRC message. The feedback can also be L1/L2 based signaling, e.g., MAC-CE/UCI (Medium Access Control-Control Element) or a PUCCH (Physical Uplink Control Channel)/PUSCH (Physical Uplink Shared Channel)/PRACH (Physical Random Access Channel) or other UL channels/signals.

In the context of DC, the UE can be configured to provide feedback related to a NES mode that is relevant to the CPC. For example, the feedback can contain information about the lack of suitable target candidate PSCell(s) for CPC, preferred configurations in terms of NES operation related to the current PSCell and/or target candidate PSCell(s), a preference to not configure or continue a NES operation on the current PSCell and/or target candidate PSCell(s), etc. The UE can be configured to provide this type of feedback to the MN that can further communicate the feedback received from the UE to the S-SN (source secondary node) and/or T-SN(s) (target secondary node).

Figure 3:
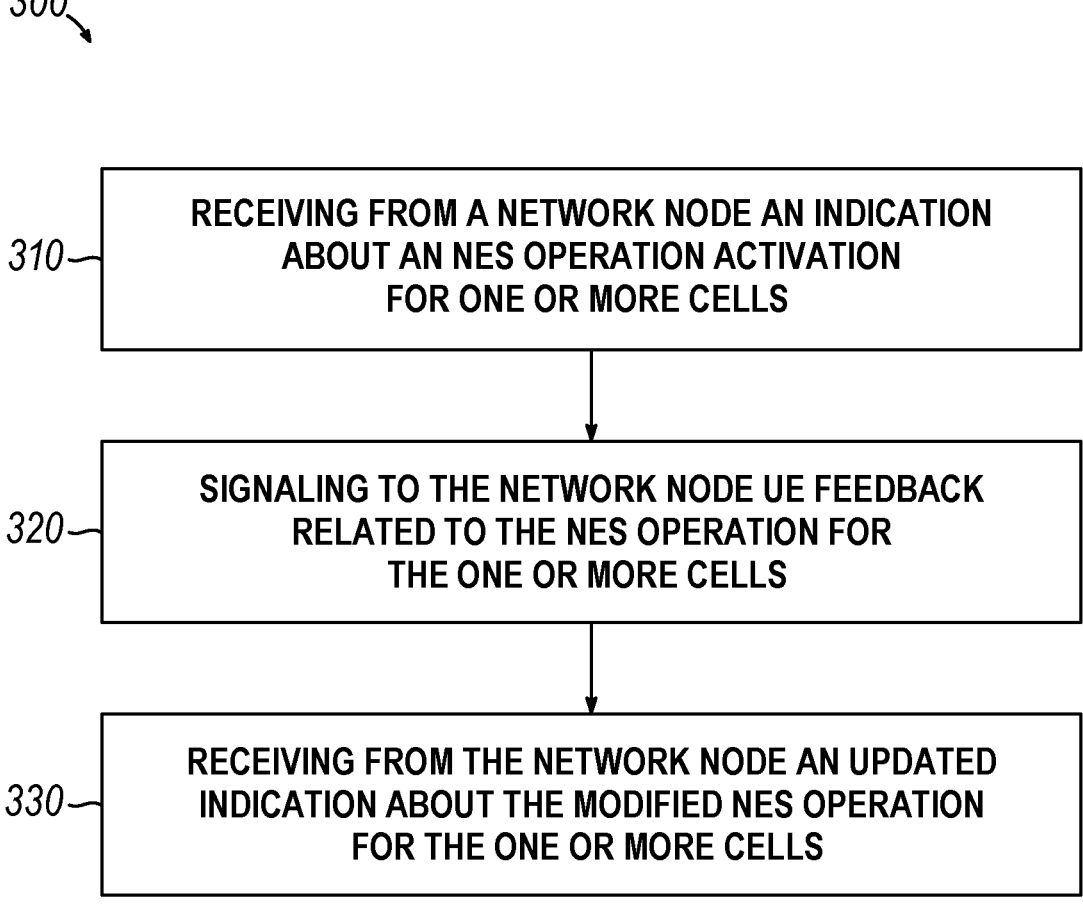
FIG. 3 illustrates a flow-chart of a method embodiment under the present disclosure.
Figure 4:
FIG. 4 illustrates a flow-chart of a method embodiment under the present disclosure.
Figure 4:
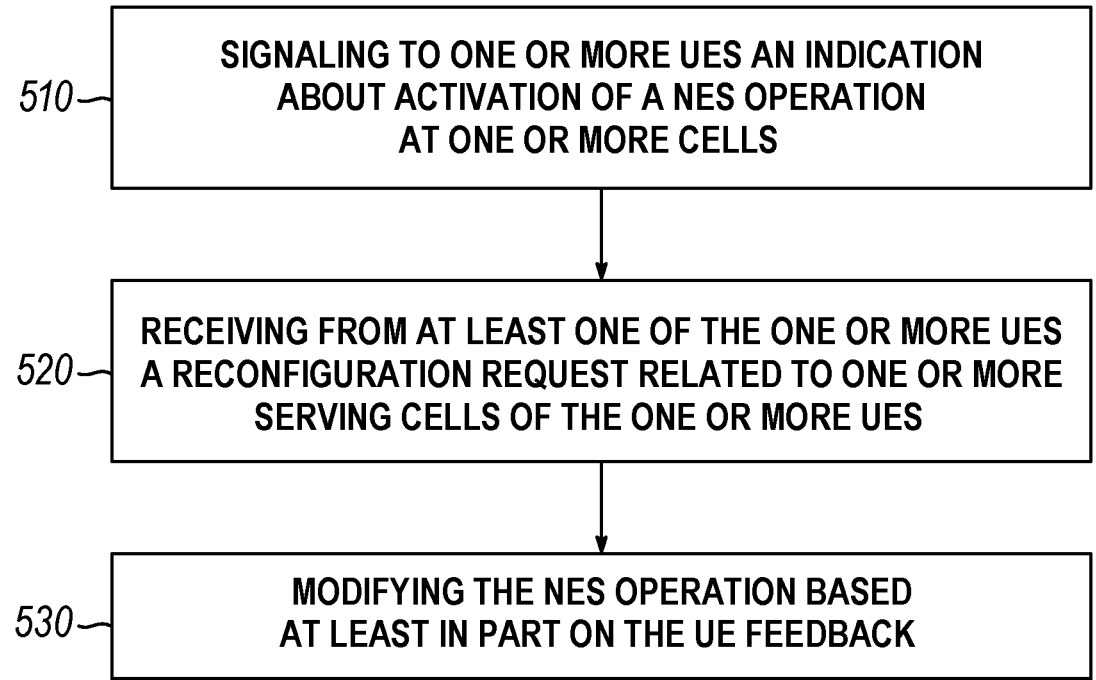

FIGS. 3 and 4 illustrate possible method embodiments from the perspective of a UE (FIG. 3) and a network node (FIG. 4).

Method 300 in FIG. 3 is a method performed by a UE for preference signaling regarding NES operation. Step 310 is receiving from a network node (e.g., gNB) an indication about NES operation activation for one or more cells. Step 320 is signaling to the network node UE feedback (e.g., reconfiguration assistance/complaint/exemption request) related to the one or more cells. Step 330 is receiving from the network node an updated indication about the modified NES operation for the one or more cells.

Method 300 can comprise a variety of alternative or additional steps or modifications, as discussed further below. For example, method 300 can further comprise receiving from the network node a configuration of constraints about the request signaling. The method can also include adapting the request signaling based on the received configuration. In some embodiments, the indication comprises information about characteristics/configuration of the intended NES operation, e.g., DTRX cycle, or going to turn off completely or going to turn off certain parts (e.g., beams) of its one or more cells (e.g., serving, or secondary cells). In some cases the indication comprises an intention by the network node to activate the NES operation at a future time. Alternatively, the indication comprises information about a first activation time of said NES operation/configuration. In certain embodiments, the indication comprises information that the NES operation is currently activated. In others, the indication comprises information about the time window during which said NES operation/configuration is supposed to be applicable.

In certain embodiments of method 300 the request comprises one or more of: a preference by the UE for omitting the NES mode, modifying the NES mode parameters, invoking a different NES mode, delaying the first activation time of the NES mode, shortening the time window during which the NES mode is activated, or similar requests. In some cases, in case there was a time window configured for the preference provision, the method can further include providing the information within the configured time window.

In some embodiments of method 300 the modification comprises one or more of: the preference by the UE for omitting the NES mode, modifying the NES mode parameters, invoking a different NES mode, delaying the first activation time of the NES mode, shortening the time window during which the NES mode is activated, or similar modifications.

In some embodiments there may be constraints on the UE request signaling. For example, the constraints may comprise that the UEs are allowed/disallowed to provide NES operation-related requests, reconfiguration assistance, or exemption from the serving or neighboring gNB's intention. In other example, the constraints comprise that the UEs are allowed to provide said reconfiguration assistance/complaint/exemption request until a certain time before the first activation time, otherwise the reconfiguration assistance/complaint/exemption request is not considered by the gNB. In other embodiments, the constraints comprise a prohibition timer configuration for request signaling.

Some embodiments may be related to CHO. In some variation of CHO the request comprises information about lack of suitable targets for CHO. In some embodiments the request comprises preferred configuration info related to one or more of the handover target cells. In other embodiments, the request comprises information to a network node about the expected duration of time during which the serving cells (and/or target cells) are not desired to operate in said NES mode. In some cases, the modification of NES operation comprises not configuring a NES mode for, e.g., not deactivating, the serving cell of the UE.

Some embodiments may be related to DTX/DRX. In some variations the request comprises information about preferred cell DTRX configuration, e.g. preferred on-duration offset, period, off-duration duration, etc. In some variations the modification of NES operation comprises reconfiguring the cell DTRX based on the preferred cell DTRX parameters.

Some embodiments of method 300 may relate to Conditional PSCell Change (CPC). In some variations the request comprises information about lack of suitable target candidate PSCell(s) for CPC. In other variations the request comprises preferred configuration in terms of NES operation related to the current PSCell and/or target candidate PSCell (s). In some cases the request comprises the preference to not configure (or continue) a NES mode on the current PSCell and/or target candidate PSCell(s). In other cases the request comprises information about the expected duration of time during which the current PSCell and/or target candidate PSCell(s) are not desired to operate in said NES mode.

Method 500 in FIG. 3 is a method in a network node (e.g., gNB) for robust activation of a NES operation. Step 510 is signaling to one or more UEs an indication about NES operation activation at one or more cells. Step 520 is receiving from at least one of the one or more UEs, UE feedback (e.g., reconfiguration assistance/complaint/exemption request) related to one or more serving cells of the one or more UEs. Step 530 is modifying the NES operation based at least in part on the UE feedback.

Method 500 can comprise a variety of alternative or additional steps or modifications, as discussed further below. In some cases, the network node further requests a neighbor cell to adapt its NES operation or configuration thereof based on the request. In some cases the network node signals to the UEs an updated indication about the modified NES operation at the one or more serving cells. In some embodiments, the network node signals to the UE constraints about the request signaling. In some embodiments, the node may comprise a gNB, eNB, base station, or any of a variety of network nodes.

In some embodiments of method 500 the indication comprises information about characteristics/configuration of the intended NES operation, e.g., DTRX cycle, or going to turn off completely or going to turn off certain parts (e.g., beams) or transmission of certain signals (e.g., SSB) of its one or more cells (e.g., serving, or secondary cells). In some variations the indication comprises an intention to activate the NES operation at a future time. In some variations the indication comprises information about a first activation time of said NES operation/configuration. In some cases the indication comprises information that the NES operation is currently activated. In some variations the indication comprises information about the time window during which said NES operation/configuration is supposed to be applicable.

In some variations of method 500 the request comprises one or more of: a preference for omitting the NES mode, modifying the NES mode parameters, invoking a different NES mode, delaying the first activation time of the NES mode, shortening the time window during which the NES mode is activated, or other similar requests. The modifications by the network node can address any of these requests.

In some cases the network node can transmit or set constraints on the UE request signaling. In some versions the constraints comprise that one or more UEs are allowed/disallowed to provide NES operation-related requests, reconfiguration assistance, or exemption from the serving or neighboring gNB's NES intention. In some cases the constraints comprise that one or more UEs are allowed to provide said reconfiguration assistance/complaint/exemption request until a certain time before the first activation time, otherwise the reconfiguration assistance/complaint/exemption request is not considered by the gNB. In some embodiments the constraints comprise a prohibition timer configuration for request signaling.

Some embodiments may deal with CHO scenarios. In some embodiments the request comprises information about lack of suitable (in terms of radio link, or NES operation of) targets for CHO. In some cases the request comprises preferred configuration info related to one or more of the handover target cells. In some cases the request comprises information about the expected duration of time during which the serving cells (and/or target cells) are not desired by the UE to operate in said NES mode. In other cases the modification of NES operation comprises not configuring a NES mode for, e.g., not deactivating, the serving cell of the UE. In some variations the network node can forward the request or the intentions of the request to a neighbor node (gNB) via NW internal interfaces (e.g., directly between the nodes via Xn, or indirectly via CN interfaces NG-C where AMF acts as a relay).

Some embodiments of method 500 can deal with cell DTRX use cases. In some cases the request comprises information about preferred cell DTRX configuration, e.g., preferred on-duration offset, period, and/or off-duration duration. In some cases the modification of NES operation comprises reconfiguring the cell DTRX based on the preferred cell DTRX parameters.

Other embodiments can deal with CPC scenarios. In some embodiments the information about lack of suitable target candidate PSCell(s) of CPC is communicated between a MN and a SN, e.g., source-SN (S-SN) and/or target-SNs (T-SNs). In some embodiments the MN provides the information to the S-SN and/or one or more of the T-SNs about preferred configuration in terms of NES operation of the current PSCell and/or target candidate PSCell(s), respectively. In some versions the MN provides the information to the S-SN and/or one or more of the T-SNs about the UE preference to not configure (or continue) a NES mode on the current PSCell and/or target candidate PSCell(s), respectively. In other embodiments the MN provides the information to the S-SN and/or one or more of the T-SNs about the expected duration of time during which the current PSCell and/or target candidate PSCell(s) are not desired by the UE to operate in said NES mode, respectively.

Figure 5:
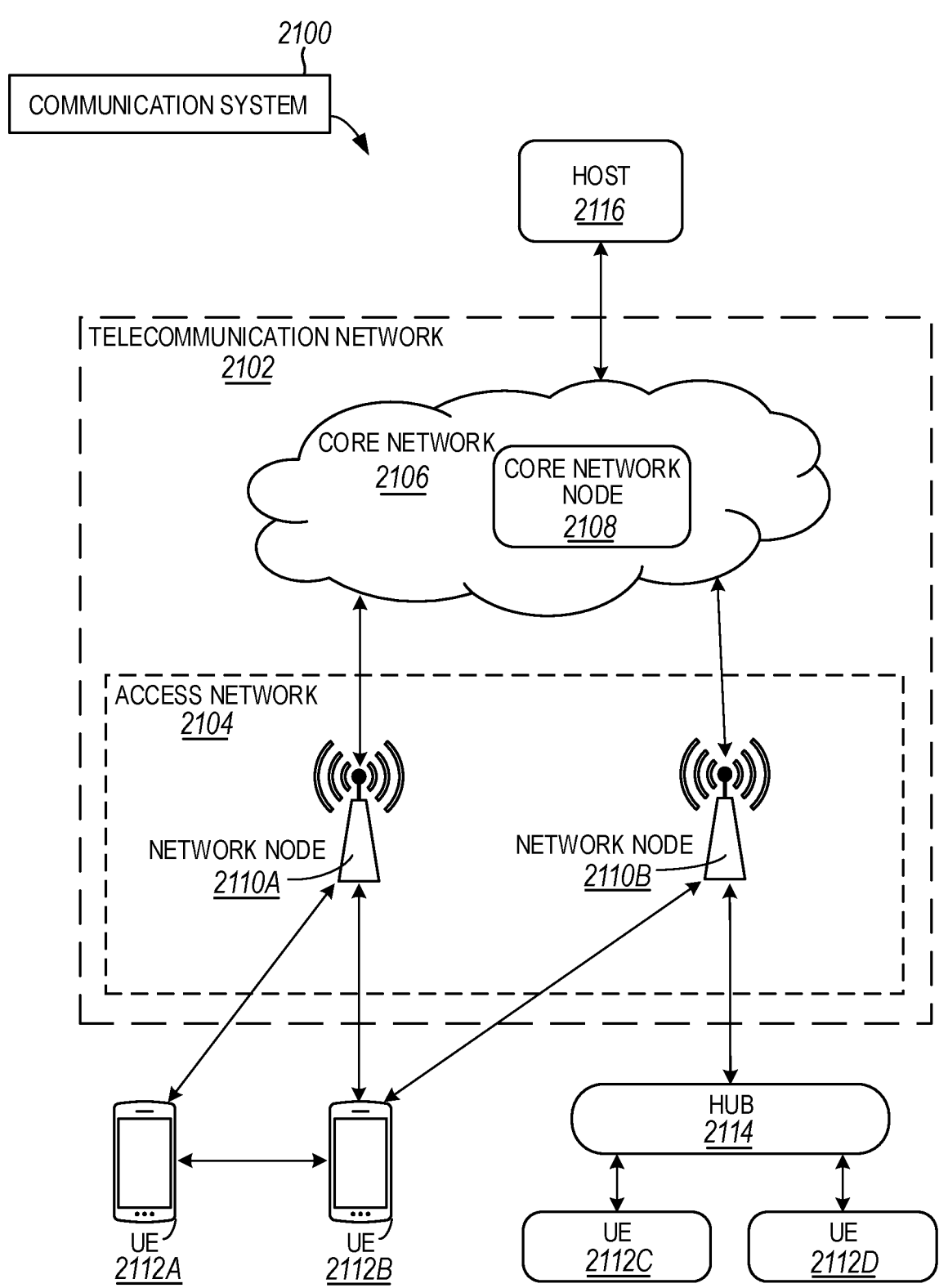
FIG. 5 shows a schematic of a communication system embodiment under the present disclosure.

FIG. 5 shows an example of a communication system 2100 in accordance with some embodiments. In the example, the communication system 2100 includes a telecommunication network 2102 that includes an access network 2104, such as a RAN, and a core network 2106, which includes one or more core network nodes 2108. The access network 2104 includes one or more access network nodes, such as network nodes 2110*a* and 2110*b* (one or more of which may be generally referred to as network nodes 2110), or any other similar 3rd Generation Partnership Project (3GPP) access node or non-3GPP access point. The network nodes 2110 facilitate direct or indirect connection of UE, such as by connecting UEs 2112*a*, 2112*b*, 2112*c*, and 2112*d* (one or more of which may be generally referred to as UEs 2112) to the core network 2106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1100 may include any number of wired or wireless networks, network nodes, UEs, and/or any other components or systems that may facilitate or participate in the communication of data and/or signals whether via wired or wireless connections. The communication system 2100 may include and/or interface with any type of communication, telecommunication, data, cellular, radio network, and/or other similar type of system.

The UEs 2112 may be any of a wide variety of communication devices, including wireless devices arranged, configured, and/or operable to communicate wirelessly with the network nodes 2110 and other communication devices. Similarly, the network nodes 2110 are arranged, capable, configured, and/or operable to communicate directly or indirectly with the UEs 2112 and/or with other network nodes or equipment in the telecommunication network 2102 to enable and/or provide network access, such as wireless network access, and/or to perform other functions, such as administration in the telecommunication network 2102.

In the depicted example, the core network 2106 connects the network nodes 2110 to one or more hosts, such as host 2116. These connections may be direct or indirect via one or more intermediary networks or devices. In other examples, network nodes may be directly coupled to hosts. The core network 2106 includes one more core network nodes (e.g., core network node 2108) that are structured with hardware and software components. Features of these components may be substantially similar to those described with respect to the UEs, network nodes, and/or hosts, such that the descriptions thereof are generally applicable to the corresponding components of the core network node 2108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 2116 may be under the ownership or control of a service provider other than an operator or provider of the access network 2104 and/or the telecommunication network 2102, and may be operated by the service provider or on behalf of the service provider. The host 2116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 2100 of FIG. 5 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/ or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 2102 is a cellular network that implements 3GPP standardized features. Accordingly, the telecommunications network 2102 may support network slicing to provide different logical networks to different devices that are connected to the telecommunication network 2102. For example, the telecommunications network 2102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 2112 are configured to transmit and/or receive information without direct human interaction. For instance, a UE may be designed to transmit information to the access network 2104 on a predetermined schedule, when triggered by an internal or external event, or in response to requests from the access network 2104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 2114 communicates with the access network 2104 to facilitate indirect communication between one or more UEs (e.g., UE 2112c and/or 2112d) and network nodes (e.g., network node 2110b). In some examples, the hub 2114 may be a controller, router, content source and analytics, or any of the other communication devices described herein regarding UEs. For example, the hub 2114 may be a broadband router enabling access to the core network 2106 for the UEs. As another example, the hub 2114 may be a controller that sends commands or instructions to one or more actuators in the UEs. Commands or instructions may be received from the UEs, network nodes 2110, or by executable code, script, process, or other instructions in the hub 2114. As another example, the hub 2114 may be a data collector that acts as temporary storage for UE data and, in some embodiments, may perform analysis or other processing of the data. As another example, the hub 2114 may be a content source. For example, for a UE that is a VR headset, display, loudspeaker or other media delivery device, the hub 2114 may retrieve VR assets, video, audio, or other media or data related to sensory information via a network node, which the hub 2114 then provides to the UE either directly, after performing local processing, and/or after adding additional local content. In still another example, the hub 2114 acts as a proxy server or orchestrator for the UEs, in particular in if one or more of the UEs are low energy IoT devices.

The hub 2114 may have a constant/persistent or intermittent connection to the network node 2110b. The hub 2114 may also allow for a different communication scheme and/or schedule between the hub 2114 and UEs (e.g., UE 2112c and/or 2112d), and between the hub 2114 and the core network 2106. In other examples, the hub 2114 is connected to the core network 2106 and/or one or more UEs via a wired connection. Moreover, the hub 2114 may be configured to connect to an M2M service provider over the access network 1104 and/or to another UE over a direct connection. In some scenarios, UEs may establish a wireless connection with the network nodes 2110 while still connected via the hub 2114 via a wired or wireless connection. In some embodiments, the hub 2114 may be a dedicated hub—that is, a hub whose primary function is to route communications to/from the UEs from/to the network node 2110b. In other embodiments, the hub 2114 may be a non-dedicated hub—that is, a device which is capable of operating to route communications between the UEs and network node 2110b, but which is additionally capable of operating as a communication start and/or end point for certain data channels.

Figure 6:
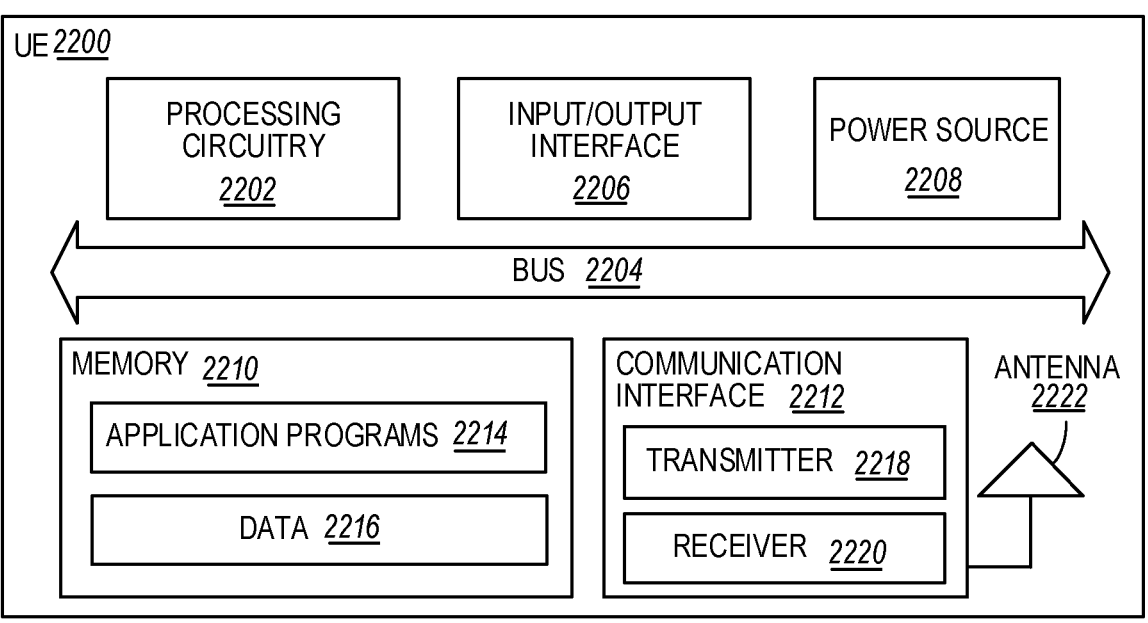
FIG. 6 shows a schematic of a user equipment embodiment under the present disclosure.

FIG. 6 shows a UE 2200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 2200 includes processing circuitry 2202 that is operatively coupled via a bus 2204 to an input/output interface 2206, a power source 2208, a memory 2210, a communication interface 2212, and/or any other component, or any combination thereof. Certain UEs may utilize all or a subset of the components shown in FIG. 10. The level of integration between the components may vary from one UE to another UE. Further, certain UEs may contain multiple instances of a component, such as multiple processors, memories, transceivers, transmitters, receivers, etc.

The processing circuitry 2202 is configured to process instructions and data and may be configured to implement any sequential state machine operative to execute instructions stored as machine-readable computer programs in the memory 2210. The processing circuitry 2202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 2202 may include multiple central processing units (CPUs).

In the example, the input/output interface 2206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 2200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 2208 is structured as a battery or battery pack. Other types of power sources, such as an external power source (e.g., an electricity outlet), photovoltaic device, or power cell, may be used. The power source 2208 may further include power circuitry for delivering power from the power source 2208 itself, and/or an external power source, to the various parts of the UE 2200 via input circuitry or an interface such as an electrical power cable. Delivering power may be, for example, for charging of the power source 2208. Power circuitry may perform any formatting, converting, or other modification to the power from the power source 2208 to make the power suitable for the respective components of the UE 2200 to which power is supplied.

The memory 2210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 2210 includes one or more application programs 2214, such as an operating system, web browser application, a widget, gadget engine, or other application, and corresponding data 2216. The memory 2210 may store, for use by the ULE 2200, any of a variety of various operating systems or combinations of operating systems.

The memory 2210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 2210 may allow the UE 2200 to access instructions, application programs and the like, stored on transitory or non-transitory memory media, to off-load data, or to upload data. An article of manufacture, such as one utilizing a communication system may be tangibly embodied as or in the memory 2210, which may be or comprise a device-readable storage medium.

The processing circuitry 2202 may be configured to communicate with an access network or other network using the communication interface 2212. The communication interface 2212 may comprise one or more communication subsystems and may include or be communicatively coupled to an antenna 2222. The communication interface 2212 may include one or more transceivers used to communicate, such as by communicating with one or more remote transceivers of another device capable of wireless communication (e.g., another UE or a network node in an access network). Each transceiver may include a transmitter 2218 and/or a receiver 2220 appropriate to provide network communications (e.g., optical, electrical, frequency allocations, and so forth). Moreover, the transmitter 2218 and receiver 2220 may be coupled to one or more antennas (e.g., antenna 2222) and may share circuit components, software or firmware, or alternatively be implemented separately.

In the illustrated embodiment, communication functions of the communication interface 2212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 2212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 2200 shown in FIG. 6.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 7:
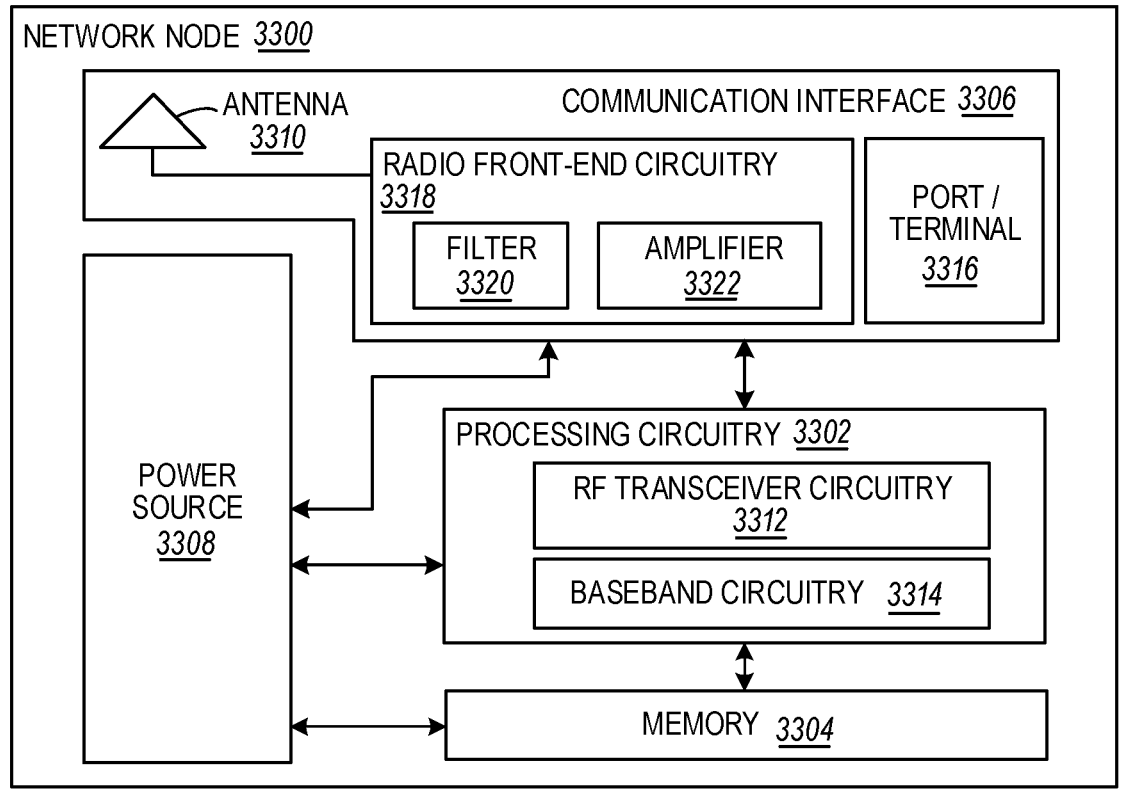
FIG. 7 shows a schematic of a network node embodiment under the present disclosure.

FIG. 7 shows a network node 3300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 3300 includes a processing circuitry 3302, a memory 3304, a communication interface 3306, and a power source 3308. The network node 3300 may be composed of multiple physically separate components (e.g., a NodeB component and a RNC component, or a BTS component and a BSC component, etc.), which may each have their own respective components. In certain scenarios in which the network node 3300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1300 may be configured to support multiple radio access technologies (RATs). In such embodiments, some components may be duplicated (e.g., separate memory 3304 for different RATs) and some components may be reused (e.g., a same antenna 3310 may be shared by different RATs). The network node 3300 may also include multiple sets of the various illustrated components for different wireless technologies integrated into network node 1300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1300.

The processing circuitry 3302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 3300 components, such as the memory 3304, to provide network node 3300 functionality.

In some embodiments, the processing circuitry 3302 includes a system on a chip (SOC). In some embodiments, the processing circuitry 3302 includes one or more of radio frequency (RF) transceiver circuitry 3312 and baseband processing circuitry 3314. In some embodiments, the radio frequency (RF) transceiver circuitry 3312 and the baseband processing circuitry 3314 may be on separate chips (or sets of chips), boards, or units, such as radio units and digital units. In alternative embodiments, part or all of RF transceiver circuitry 3312 and baseband processing circuitry 3314 may be on the same chip or set of chips, boards, or units.

The memory 3304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 3302. The memory 3304 may store any suitable instructions, data, or information, including a computer program, software, an application including one or more of logic, rules, code, tables, and/or other instructions capable of being executed by the processing circuitry 3302 and utilized by the network node 3300. The memory 3304 may be used to store any calculations made by the processing circuitry 3302 and/or any data received via the communication interface 3306. In some embodiments, the processing circuitry 3302 and memory 3304 is integrated.

The communication interface 3306 is used in wired or wireless communication of signaling and/or data between a network node, access network, and/or UE. As illustrated, the communication interface 3306 comprises port(s)/terminal(s) 3316 to send and receive data, for example to and from a network over a wired connection. The communication interface 3306 also includes radio front-end circuitry 3318 that may be coupled to, or in certain embodiments a part of, the antenna 3310. Radio front-end circuitry 3318 comprises filters 3320 and amplifiers 3322. The radio front-end circuitry 3318 may be connected to an antenna 3310 and processing circuitry 3302. The radio front-end circuitry may be configured to condition signals communicated between antenna 3310 and processing circuitry 3302. The radio front-end circuitry 3318 may receive digital data that is to be sent out to other network nodes or UEs via a wireless connection. The radio front-end circuitry 3318 may convert the digital data into a radio signal having the appropriate channel and bandwidth parameters using a combination of filters 3320 and/or amplifiers 3322. The radio signal may then be transmitted via the antenna 3310. Similarly, when receiving data, the antenna 3310 may collect radio signals which are then converted into digital data by the radio front-end circuitry 3318. The digital data may be passed to the processing circuitry 3302. In other embodiments, the communication interface may comprise different components and/or different combinations of components.

In certain alternative embodiments, the network node 3300 does not include separate radio front-end circuitry 3318, instead, the processing circuitry 3302 includes radio front-end circuitry and is connected to the antenna 3310. Similarly, in some embodiments, all or some of the RF transceiver circuitry 3312 is part of the communication interface 3306. In still other embodiments, the communication interface 3306 includes one or more ports or terminals 3316, the radio front-end circuitry 3318, and the RF transceiver circuitry 3312, as part of a radio unit (not shown), and the communication interface 3306 communicates with the baseband processing circuitry 3314, which is part of a digital unit (not shown).

The antenna 3310 may include one or more antennas, or antenna arrays, configured to send and/or receive wireless signals. The antenna 3310 may be coupled to the radio front-end circuitry 3318 and may be any type of antenna capable of transmitting and receiving data and/or signals wirelessly. In certain embodiments, the antenna 3310 is separate from the network node 3300 and connectable to the network node 3300 through an interface or port.

The antenna 3310, communication interface 3306, and/or the processing circuitry 3302 may be configured to perform any receiving operations and/or certain obtaining operations described herein as being performed by the network node. Any information, data and/or signals may be received from a UE, another network node and/or any other network equipment. Similarly, the antenna 3310, the communication interface 3306, and/or the processing circuitry 3302 may be configured to perform any transmitting operations described herein as being performed by the network node. Any information, data and/or signals may be transmitted to a UE, another network node and/or any other network equipment.

The power source 3308 provides power to the various components of network node 3300 in a form suitable for the respective components (e.g., at a voltage and current level needed for each respective component). The power source 3308 may further comprise, or be coupled to, power management circuitry to supply the components of the network node 3300 with power for performing the functionality described herein. For example, the network node 3300 may be connectable to an external power source (e.g., the power grid, an electricity outlet) via an input circuitry or interface such as an electrical cable, whereby the external power source supplies power to power circuitry of the power source 3308. As a further example, the power source 3308 may comprise a source of power in the form of a battery or battery pack which is connected to, or integrated in, power circuitry. The battery may provide backup power should the external power source fail.

Embodiments of the network node 3300 may include additional components beyond those shown in FIG. 7 for providing certain aspects of the network node's functionality, including any of the functionality described herein and/or any functionality necessary to support the subject matter described herein. For example, the network node 3300 may include user interface equipment to allow input of information into the network node 3300 and to allow output of information from the network node 3300. This may allow a user to perform diagnostic, maintenance, repair, and other administrative functions for the network node 3300.

Figure 8:
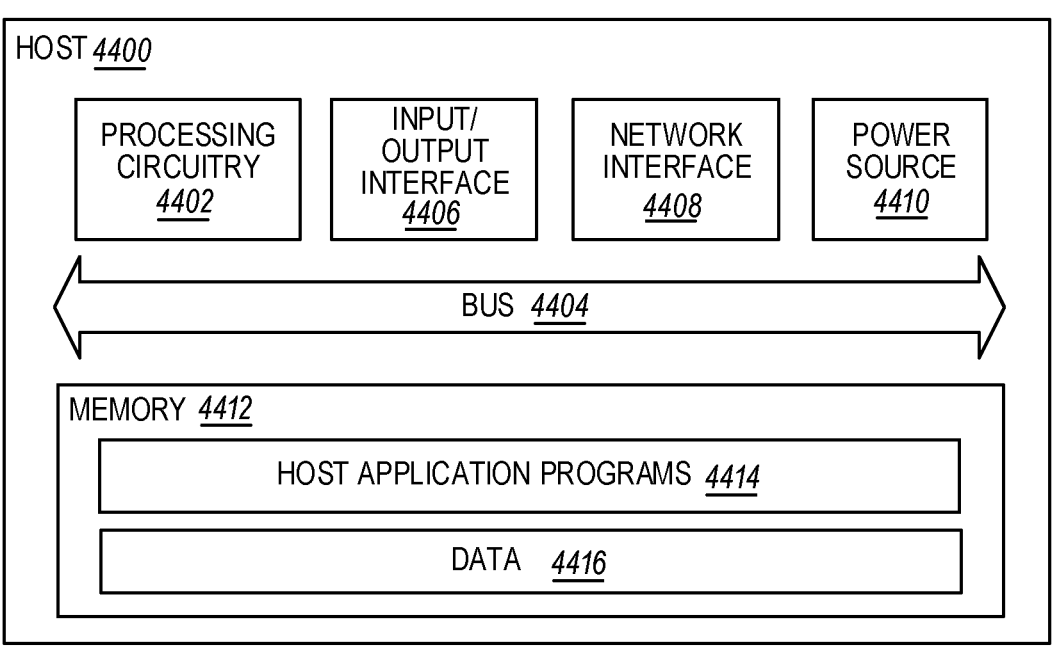
FIG. 8 shows a schematic of a host embodiment under the present disclosure.

FIG. 8 is a block diagram of a host 4400, which may be an embodiment of the host 2116 of FIG. 5, in accordance with various aspects described herein. As used herein, the host 4400 may be or comprise various combinations hardware and/or software, including a standalone server, a blade server, a cloud-implemented server, a distributed server, a virtual machine, container, or processing resources in a server farm. The host 4400 may provide one or more services to one or more UEs.

The host 4400 includes processing circuitry 4402 that is operatively coupled via a bus 4404 to an input/output interface 4406, a network interface 4408, a power source 4410, and a memory 4412. Other components may be included in other embodiments. Features of these components may be substantially similar to those described with respect to the devices of previous figures, such as FIGS. 6 and 7, such that the descriptions thereof are generally applicable to the corresponding components of host 4400.

The memory 4412 may include one or more computer programs including one or more host application programs 4414 and data 4416, which may include user data, e.g., data generated by a UE for the host 4400 or data generated by the host 4400 for a UE. Embodiments of the host 4400 may utilize only a subset or all of the components shown. The host application programs 4414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 4414 may also provide for user authentication and licensing checks and may periodically report health, routes, and content availability to a central node, such as a device in or on the edge of a core network. Accordingly, the host 4400 may select and/or indicate a different host for over-the-top services for a UE. The host application programs 4414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 9:
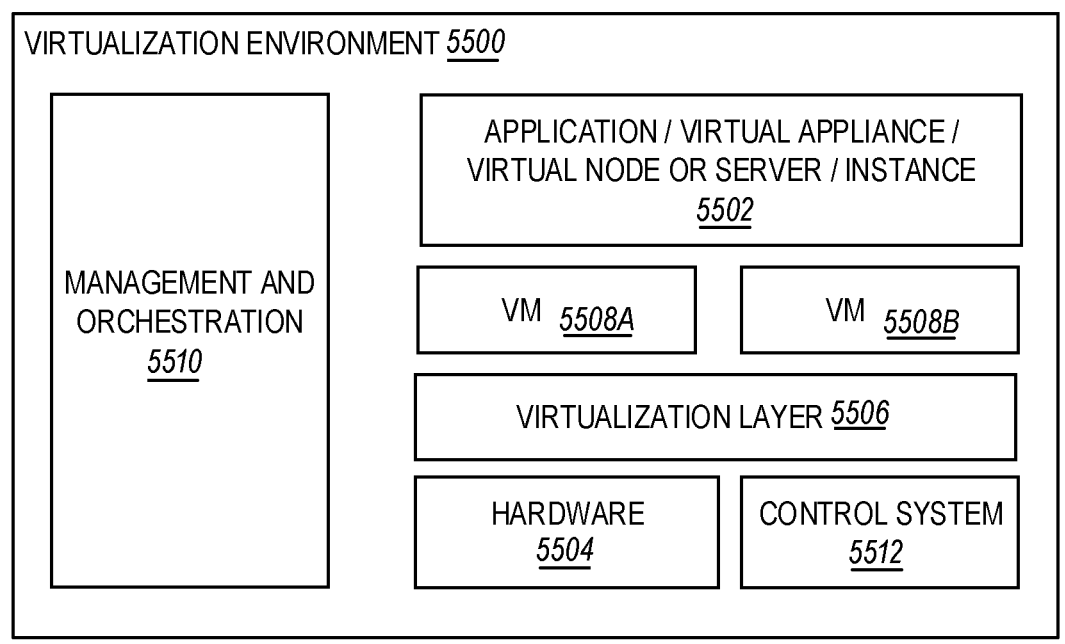
FIG. 9 shows a schematic of a virtualization environment embodiment under the present disclosure.

FIG. 9 is a block diagram illustrating a virtualization environment 5500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 5500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 5502 (which may alternatively be called software instances, virtual appliances, network functions, virtual nodes, virtual network functions, etc.) are run in the virtualization environment 5500 to implement some of the features, functions, and/or benefits of some of the embodiments disclosed herein.

Hardware 5504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 5506 (also referred to as hypervisors or virtual machine monitors (VMMs)), provide VMs 5508a and 5508b (one or more of which may be generally referred to as VMs

5508), and/or perform any of the functions, features and/or benefits described in relation with some embodiments described herein. The virtualization layer 5506 may present a virtual operating platform that appears like networking hardware to the VMs 5508.

The VMs 5508 comprise virtual processing, virtual memory, virtual networking or interface and virtual storage, and may be run by a corresponding virtualization layer 5506. Different embodiments of the instance of a virtual appliance 5502 may be implemented on one or more of VMs 5508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 5508 may be a software implementation of a physical machine that runs programs as if they were executing on a physical, non-virtualized machine. Each of the VMs 5508, and that part of hardware 5504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 5508 on top of the hardware 5504 and corresponds to the application 5502.

Hardware 5504 may be implemented in a standalone network node with generic or specific components. Hardware 5504 may implement some functions via virtualization. Alternatively, hardware 5504 may be part of a larger cluster of hardware (e.g., such as in a data center or CPE) where many hardware nodes work together and are managed via management and orchestration 5510, which, among others, oversees lifecycle management of applications 5502. In some embodiments, hardware 5504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 5512 which may alternatively be used for communication between hardware nodes and radio units.

Figure 10:
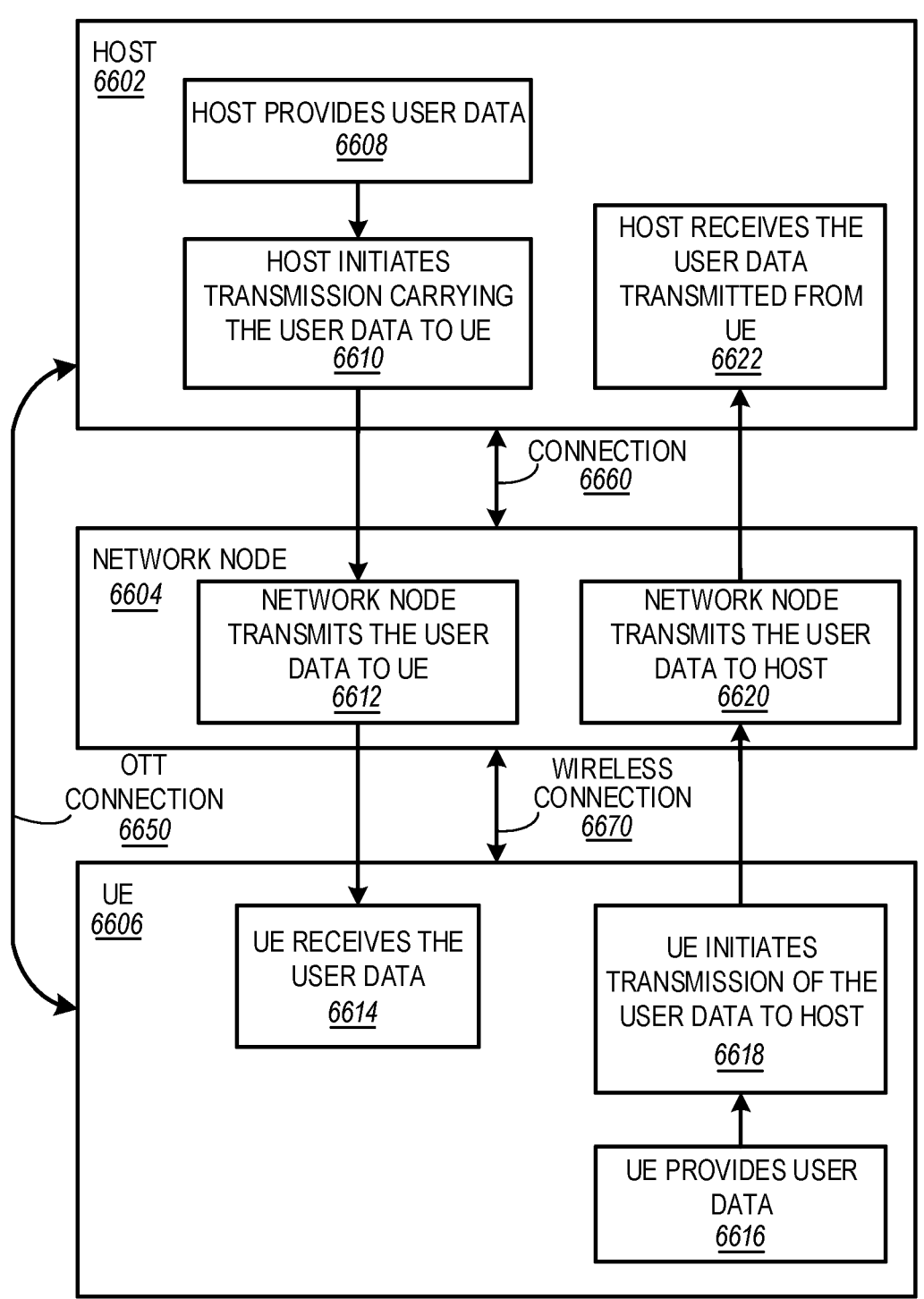
FIG. 10 shows a schematic representation of an embodiment of communication amongst nodes, hosts, and user equipment under the present disclosure.

FIG. 10 shows a communication diagram of a host 6602 communicating via a network node 6604 with a UE 6606 over a partially wireless connection in accordance with some embodiments. Example implementations, in accordance with various embodiments, of the UE (such as a UE 2112a of FIG. 5 and/or UE 2200 of FIG. 6), network node (such as network node 2110a of FIG. 5 and/or network node 3300 of FIG. 7), and host (such as host 2116 of FIG. 5 and/or host 4400 of FIG. 8) discussed in the preceding paragraphs will now be described with reference to FIG. 10.

Like host 4400, embodiments of host 6602 include hardware, such as a communication interface, processing circuitry, and memory. The host 6602 also includes software, which is stored in or accessible by the host 6602 and executable by the processing circuitry. The software includes a host application that may be operable to provide a service to a remote user, such as the UE 6606 connecting via an over-the-top (OTT) connection 6650 extending between the UE 6606 and host 6602. In providing the service to the remote user, a host application may provide user data which is transmitted using the OTT connection 6650.

The network node 6604 includes hardware enabling it to communicate with the host 6602 and UE 6606. The connection 6660 may be direct or pass through a core network (like core network 2106 of FIG. 5) and/or one or more other intermediate networks, such as one or more public, private, or hosted networks. For example, an intermediate network may be a backbone network or the Internet.

The UE 6606 includes hardware and software, which is stored in or accessible by UE 6606 and executable by the UE's processing circuitry. The software includes a client application, such as a web browser or operator-specific "app" that may be operable to provide a service to a human or non-human user via UE 6606 with the support of the host 6602. In the host 6602, an executing host application may communicate with the executing client application via the OTT connection 6650 terminating at the UE 6606 and host 6602. In providing the service to the user, the UE's client application may receive request data from the host's host application and provide user data in response to the request data. The OTT connection 6650 may transfer both the request data and the user data. The UE's client application may interact with the user to generate the user data that it provides to the host application through the OTT connection 6650.

The OTT connection 6650 may extend via a connection 6660 between the host 6602 and the network node 6604 and via a wireless connection 6670 between the network node 6604 and the UE 6606 to provide the connection between the host 6602 and the UE 6606. The connection 6660 and wireless connection 6670, over which the OTT connection 6650 may be provided, have been drawn abstractly to illustrate the communication between the host 6602 and the UE 1606 via the network node 6604, without explicit reference to any intermediary devices and the precise routing of messages via these devices.

As an example of transmitting data via the OTT connection 6650, in step 6608, the host 6602 provides user data, which may be performed by executing a host application. In some embodiments, the user data is associated with a particular human user interacting with the UE 6606. In other embodiments, the user data is associated with a UE 6606 that shares data with the host 6602 without explicit human interaction. In step 6610, the host 6602 initiates a transmission carrying the user data towards the UE 6606. The host 6602 may initiate the transmission responsive to a request transmitted by the UE 6606. The request may be caused by human interaction with the UE 6606 or by operation of the client application executing on the UE 6606. The transmission may pass via the network node 6604, in accordance with the teachings of the embodiments described throughout this disclosure. Accordingly, in step 6612, the network node 6604 transmits to the UE 6606 the user data that was carried in the transmission that the host 6602 initiated, in accordance with the teachings of the embodiments described throughout this disclosure. In step 6614, the UE 6606 receives the user data carried in the transmission, which may be performed by a client application executed on the UE 6606 associated with the host application executed by the host 6602.

In some examples, the UE 6606 executes a client application which provides user data to the host 6602. The user data may be provided in reaction or response to the data received from the host 6602. Accordingly, in step 6616, the UE 6606 may provide user data, which may be performed by executing the client application. In providing the user data, the client application may further consider user input received from the user via an input/output interface of the UE 6606. Regardless of the specific manner in which the user data was provided, the UE 6606 initiates, in step 6618, transmission of the user data towards the host 6602 via the network node 6604. In step 6620, in accordance with the teachings of the embodiments described throughout this disclosure, the network node 6604 receives user data from the UE 6606 and initiates transmission of the received user data towards the host 6602. In step 6622, the host 6602 receives the user data carried in the transmission initiated by the UE 6606.

One or more of the various embodiments improve the performance of OTT services provided to the UE 6606 using the OTT connection 6650, in which the wireless connection 6670 forms the last segment. More precisely, the teachings of these embodiments may improve the data rate, latency, and/or power consumption and thereby provide benefits such as reduced user waiting time, relaxed restriction on file size, improved content resolution, better responsiveness, and/or extended battery lifetime.

In an example scenario, factory status information may be collected and analyzed by the host 6602. As another example, the host 6602 may process audio and video data which may have been retrieved from a UE for use in creating maps. As another example, the host 6602 may collect and analyze real-time data to assist in controlling vehicle congestion (e.g., controlling traffic lights). As another example, the host 6602 may store surveillance video uploaded by a UE. As another example, the host 6602 may store or control access to media content such as video, audio, VR or AR which it can broadcast, multicast or unicast to UEs. As other examples, the host 6602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 6650 between the host 6602 and UE 6606, in response to variations in the measurement results. The measurement procedure and/or the network functionality for reconfiguring the OTT connection may be implemented in software and hardware of the host 6602 and/or UE 6606. In some embodiments, sensors (not shown) may be deployed in or in association with other devices through which the OTT connection 6650 passes; the sensors may participate in the measurement procedure by supplying values of the monitored quantities exemplified above, or supplying values of other physical quantities from which software may compute or estimate the monitored quantities. The reconfiguring of the OTT connection 6650 may include message format, retransmission settings, preferred routing etc.; the reconfiguring need not directly alter the operation of the network node 6604. Such procedures and functionalities may be known and practiced in the art. In certain embodiments, measurements may involve proprietary UE signaling that facilitates measurements of throughput, propagation times, latency and the like, by the host 6602. The measurements may be implemented in that software causes messages to be transmitted, in particular empty or 'dummy' messages, using the OTT connection 6650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

It will be appreciated that computer systems are increasingly taking a wide variety of forms. In this description and in the claims, the terms "controller," "computer system," or "computing system" are defined broadly as including any device or system—or combination thereof—that includes at least one physical and tangible processor and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, and even devices that conventionally have not been considered a computing system, such as wearables (e.g., glasses).

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

In general, the various exemplary embodiments may be implemented in hardware or special purpose chips, circuits, software, logic, or any combination thereof. For example, some aspects may be implemented in hardware, while other aspects may be implemented in firmware or software which may be executed by a controller, microprocessor, or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques, or methods described herein may be implemented in, as non-limiting examples, hardware, software, firmware, special purpose circuits or logic, general purpose hardware or controller or other computing devices, or some combination thereof.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Abbreviations and Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or embodiments includes a specific reference to one or more embodiments thereof, and vice versa, and is intended to provide illustrative examples without limiting the scope of the present disclosure, which is indicated by the appended claims rather than by the present description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Conclusion

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims. The terms and expressions which have been employed herein are used as terms of description and not of limitation, and there is no intention in the use of such terms and expressions of excluding any equivalents of the features shown and described or portions thereof, but it is recognized that various modifications are possible within the scope of the present disclosure. Thus, it should be understood that although the present disclosure has been specifically disclosed in part by certain embodiments, and optional features, modification and variation of the concepts herein disclosed may be resorted to by those skilled in the art, and such modifications and variations are considered to be within the scope of this present description.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

It will be apparent to one of ordinary skill in the art that methods, devices, device elements, materials, procedures, and techniques other than those specifically described herein can be applied to the practice of the described embodiments as broadly disclosed herein without resort to undue experimentation. All art-known functional equivalents of methods, devices, device elements, materials, procedures, and techniques specifically described herein are intended to be encompassed by this present disclosure.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure.

The above-described embodiments are examples only. Alterations, modifications, and variations may be effected to the particular embodiments by those of skill in the art without departing from the scope of the description, which is defined solely by the appended claims.

What is claimed is:

1. A method performed by a user equipment, UE, for preference signaling regarding Network Energy Saving, NES, operation, comprising:
   receiving from a network node an indication about an NES operation activation for one or more cells;

signaling to the network node UE feedback related to the NES operation for the one or more cells, wherein the UE feedback comprises a request that actively requests the network node to modify or omit the NES operation, wherein the signaling occurs within a pre-warning window provided by the network node during which the UE can request the network node to not activate the NES operation, wherein the UE is allowed to provide the request until a certain time before a first activation time of the NES operation, and wherein requests provided after said certain time are not considered by the network node; and receiving from the network node an updated indication about a modified NES operation for the one or more cells.

2. The method of claim 1, further comprising receiving from the network node one or more possible configurations for the NES operation from which the UE can indicate a preference.

3. The method of claim 2, further comprising adapting the signaling based on the received one or more possible configurations.

4. The method of claim 2, wherein the one or more configurations comprise at least one of: that the UE is allowed to provide NES operation-related requests; that the UE is disallowed to provide NES operation-related requests; that the UE is allowed to provide reconfiguration assistance; that the UE is disallowed to provide reconfiguration assistance; that the UE is allowed an exemption from a serving or neighboring network node's intention; that the UE is disallowed an exemption from a serving or neighboring network node's intention; that the UE is allowed to provide said NES operation-related requests, reconfiguration assistance, or exemption until a certain time before a first activation time, otherwise said NES operation-related requests, reconfiguration assistance, or exemption is not considered by the network node; a prohibition timer configuration for request signaling.

5. The method of claim 1, wherein the indication comprises at least one of:
   characteristics of the NES operation; configuration of the NES operation; turning off completely;
   turning off one or more components; turning off one or more beams; turning off one or more serving cells; turning off one or more secondary cells; discontinuous transmission or reception cycle information.

6. The method of claim 1, wherein the indication comprises one or more of:
   an intention by the network node to activate the NES operation at a future time; information about a first activation time of the NES operation; information indicating that the NES operation is currently activated; information about a time window during which the NES operation is supposed to be applicable.

7. The method of claim 1, wherein the UE feedback comprises one or more of: a preference by the UE for omitting the NES operation; modifying the NES operation parameters; invoking a different NES operation; delaying a first activation time of the NES operation; shortening a time window during which the NES operation is activated.

8. The method of claim 1, further comprising, in case the indication identified a time window configured for UE feedback, signaling the UE feedback within the identified time window.

9. The method of claim 1, wherein the UE feedback comprises one or more of: information about lack of suitable targets for conditional handover; preferred configuration information related to one or more possible handover target cells; information about an expected duration of time during which one or more serving cells and/or target cells are not desired to operate in said NES operation; a request to not deactivate a serving cell of the UE; information about preferred cell discontinuous transmission or reception configuration; a preferred on-duration offset; a period; an off-duration duration; information about lack of suitable target candidate primary secondary cells, PSCells, for Conditional PSCell Change, CPC; preferred configuration in terms of NES operation related to a current PSCell and/or one or more target candidate PSCells; a preference to not configure or continue a NES operation on the current PSCell and/or one or more target candidate PSCells; information about an expected duration of time during which the current PSCell and/or one or more target candidate PSCells are not desired to operate in said NES operation; assistance request; a complaint; an exemption request.

10. A method performed by a network for activation of a Network Energy Saving, NES, operation, comprising:

signaling, to one or more user equipments, UEs, an indication about activation of a NES operation at one or more cells;

receiving, from at least one of the one or more UEs, UE feedback related to the one or more cells, wherein the UE feedback comprises a reconfiguration request or an exemption request that actively requests modification or omission of the NES operation, wherein the UE feedback is received within a pre-warning window during which UEs can request to not activate the NES operation, wherein UEs are allowed to provide the UE feedback until a certain time before a first activation time of the NES operation, and wherein UE feedback provided after said certain time is not considered by the network node; and modifying the NES operation based at least in part on the UE feedback.

11. The method of claim 10, further comprising transmitting to a neighbor cell or neighbor node one or more of: a request to adapt the NES operation or configuration thereof based on the UE feedback; a forwarded at least a portion of the UE feedback via one or more network internal interfaces.

12. The method of claim 11, wherein the one or more network internal interfaces comprises one or more of:

Xn; or indirectly via core network, CN, Next Generation control plane interfaces, NG-C, where Access and Mobility Management Function, AMF, acts as a relay.

13. The method of claim 10, further comprising signaling to at least one of the one or more UEs one or more of: an updated indication about the modified NES operation; one or more possible configurations for the NES operation from which the UE can indicate a preference.

14. The method of claim 10, wherein the indication comprises one or more of:

information about the NES operation; characteristics of the NES operation; configuration of the NES operation; discontinuous transmission or reception cycle; turning off completely one or more components; partially turning off one or more components; transmission of certain signals of the one or more cells; an intention to activate the NES operation at a future time; information about a first activation time of said NES operation; information that the NES operation is currently activated; information about a time window during which said NES operation is supposed to be applicable.

15. The method of claim 10, wherein the UE feedback comprises one or more of: information about lack of suitable targets for conditional handover; preferred configuration information related to one or more possible handover target cells; information about an expected duration of time during which one or more serving cells and/or target cells are not desired to operate in said NES operation; a request to not deactivate a serving cell of the UE; information about preferred cell discontinuous transmission or reception configuration; a preferred on-duration offset; a period; an off-duration duration; information about lack of suitable target candidate primary secondary cells, PSCells, for Conditional PSCell Change, CPC; preferred configuration in terms of NES operation related to a current PSCell and/or one or more target candidate PSCells; a preference to not configure or continue a NES operation on the current PSCell and/or one or more target candidate PSCells; information about an expected duration of time during which the current PSCell and/or one or more target candidate PSCells are not desired to operate in said NES operation; assistance request; a complaint; an exemption request.

16. The method of claim 15, wherein information about lack of suitable target candidate primary secondary cells, PSCells, of Conditional PSCell Change, CPC, is communicated between a master node, MN, and one or more secondary nodes, SNs, one or more source secondary nodes, S-SNs, and/or one or more target secondary nodes, T-SNs.

17. The method of claim 16, wherein the MN performs at least one of:

providing the information to the one or more S-SNs and/or one or more T-SNs about preferred configuration in terms of NES operation of a current PSCell and/or one or more target candidate PSCells, respectively; providing the information to the one or more S-SNs and/or one or more T-SNs about a UE preference to not configure or to continue a NES operation on the current PSCell and/or one or more target candidate PSCells, respectively; providing the information to the one or more S-SNs and/or one or more T-SNs about an expected duration of time during which a current PSCell and/or one or more target candidate PSCells are not desired by the UE to operate in said NES operation, respectively.

18. The method of claim 10, wherein the modifying comprises at least one of: configuring a NES operation to not deactivate a serving cell of at least one of the one or more UEs; reconfiguring a cell discontinuous transmission or reception based on preferred cell discontinuous transmission or reception parameters; requesting a neighbor cell to adapt its NES operation; omitting the NES operation; modifying one or more parameters of the NES operation; invoking a different NES operation; delaying a first activation time of the NES operation; shortening a time window during which the NES operation is activated.

19. A method performed by a network for activation of a Network Energy Saving, NES, operation, comprising:

signaling, to one or more user equipments, UEs, an indication about activation of a NEW operation at one or more cells;

receiving, from at least one of the one or more UEs, UE feedback related to the one or more cells; and modifying the NES operation based at least in part on the UE feedback, wherein the UE feedback comprises one or more of: information about lack of suitable targets for conditional handover; preferred configuration information related to one or more possible handover target cells;

information about an expected duration of time during which one or more serving cells and/or target cells are not desired to operate in said NES operation; a request to not deactivate a serving cell of the UE; information about preferred cell discontinuous transmission or reception configuration; a preferred on-duration offset; a period; an off-duration duration; information about lack of suitable target candidate primary secondary cells, PSCells, for Conditional PSCell Change, CPC; preferred configuration in terms of NES operation related to a current PSCell and/or one or more target candidate PSCells; a preference to not configure or continue a NES operation on the current PSCell and/or one or more target candidate PSCells; information about an expected duration of time during which the current PSCell and/or one or more target candidate PSCells are not desired to operate in said NES operation; assistance request; a complaint; an exemption request, and wherein information about lack of suitable target candidate primary secondary cells, PSCells, of Conditional PSCell Change, CPC, is communicated between a master node, MN, and one or more secondary nodes, SNs, one or more source secondary nodes, S-SNs, and/or one or more target secondary nodes, T-SNs.

20. The method of claim 19, wherein the MN performs at least one of: providing the information to the one or more S-SNs and/or one or more T-SNs about preferred configuration in terms of NES operation of a current PSCell and/or one or more target candidate PSCells, respectively; providing the information to the one or more S-SNs and/or one or more T-SNs about a UE preference to not configure or to continue a NES operation on the current PSCell and/or one or more target candidate PSCells, respectively; providing the information to the one or more S-SNs and/or one or more T-SNs about an expected duration of time during which a current PSCell and/or one or more target candidate PSCells are not desired by the UE to operate in said NES operation, respectively.

* * * * *